March 3, 1942.　　　C. I. HAYES　　　2,275,106
CIRCULATION OF HEAT TREATMENT ATMOSPHERES
Filed Feb. 20, 1939

INVENTOR
Carl I. Hayes
BY Nathaniel Frucht
ATTORNEY

Patented Mar. 3, 1942

2,275,106

UNITED STATES PATENT OFFICE 2,275,106

CIRCULATION OF HEAT TREATMENT ATMOSPHERES

Carl I. Hayes, Providence, R. I.

Application February 20, 1939, Serial No. 257,383

5 Claims. (Cl. 148—17)

My present invention relates to the art of heat treating, and has particular reference to enveloping atmospheres for materials undergoing heat treatment.

It is the principal object of my invention to provide a method for enveloping materials undergoing heat treatment with special atmospheres containing predetermined gaseous constituents.

Another object of my invention is to provide an enveloping atmosphere which continually circulates through the heat treating chamber.

A further object of my invention is to provide a simple and effective arrangement for combusting gaseous mixtures which do not, of themselves, liberate sufficient heat to maintain combustion.

An additional object is to condition and modify gaseous products of combustion for use as an enveloping atmosphere for work undergoing heat treatment.

With the above and other objects and advantageous features in view, my invention consists of a novel method of operation more fully disclosed in the detailed description following, in conjunction with the accompanying drawings, and more specifically defined in the claims appended thereto.

It has been found desirable to provide a simple and effective arrangement for obtaining gaseous products of combustion for use as an enveloping atmosphere for material undergoing heat treatment, said gaseous products having a very high CO content. The proportions of combustible and oxygen bearing substances necessary to obtain a very high CO content do not, of themselves, liberate sufficient heat during combustion to maintain combustion at room temperatures: I have, therefore, provided an arrangement for maintaining the desired combustion and for conditioning and modifying the resultant gaseous products of combustion to obtain the most effective heat treatment of the material enveloped therewith.

Figure 1:
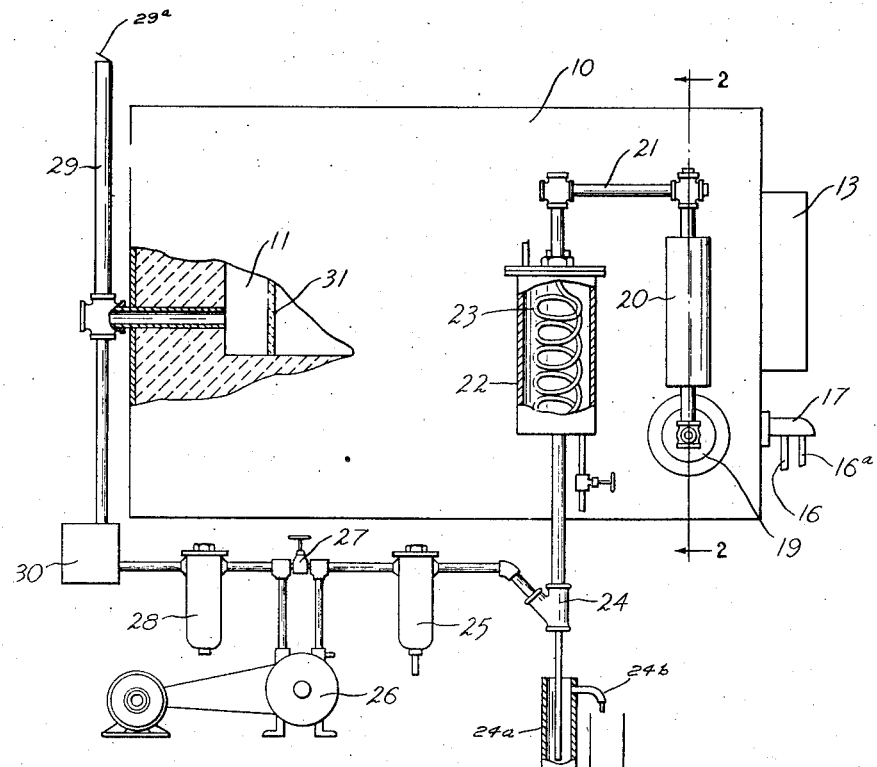
Fig. 1 is a schematic arrangement of the novel apparatus.
Figure 2:
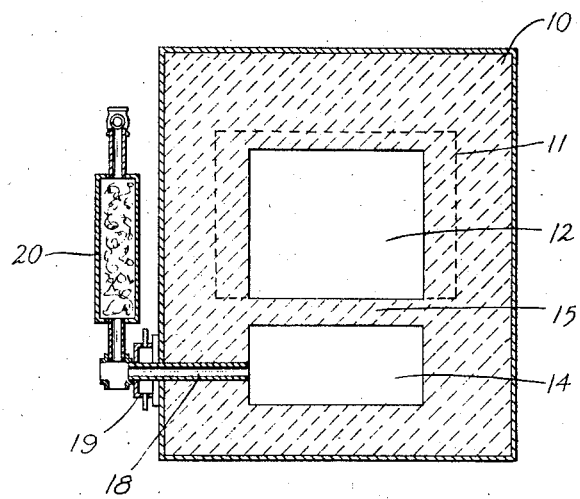
Fig. 2 is a section thereof on the line 2—2 of Fig. 1.

Referring to the drawings, Fig. 1 schematically illustrates the invention as applied to a heat treatment furnace of the Hayes type as described in U. S. Patent No. 1,724,583. The furnace 10 has a heat treatment chamber 11, which may be heated in any suitable manner to obtain a predetermined temperature therein, a throat 12 being provided to permit inlet and removal of material to be heat treated, and having a door 13 of standard type. A combustion chamber 14 is preferably positioned beneath the hearth of the heat treatment chamber to obtain the benefit of heat transmitted therefrom through the refractory wall 15; and regulated quantities of combustible and oxygen supplying materials such as gas and air are continuously supplied through inlet conduits 16, 16a, to a burner 17 which leads to the combustion chamber.

The gaseous products of combustion are withdrawn from the combustion chamber in an amount in excess of the gas and air inflow, are conditioned and modified, and are passed through the heat treatment chamber and recirculated through the combustion chamber, as hereinafter described.

As illustrated in Fig. 1, the gaseous products of combustion pass through an outlet conduit 18, which is water cooled, as by means of a water jacket 19, into a conditioning chamber 20 containing nickel as a catalyst to help complete the gaseous reactions, and copper to remove any sulphur content, the nickel and copper being illustrated in the form of wire. The water jacket 19 reduces the temperature of the entering gases, and thus protects the chamber 20.

The treated gases then pass through conduit 21 to a condenser 22, where they preferably pass through a copper coil 23 surrounded by flowing cooling water, the coil having a continual downward slope so that the condensing moisture content of the gases, which accumulates to a flow of water, may pass unimpeded through the coil to a separator fitting 24 where the water separates from the gas. The separator fitting 24 is preferably of the Y type, to separate water vapor suspended in the gases by deflection through the abrupt turn of the Y.

The separated water flows through a water-sealed trap 24a to waste 24b, and the dried gases pass a trap 25 having a screen and expansion chamber to remove additional moisture, dust or carbon, the gases then entering a power-driven suction pump 26 of standard type equipped with a by-pass valve 27 to regulate the flow, and being driven through a second trap 28 to remove any oil collected from the pump. The traps 25 and 28 have the usual drains and have removable heads to permit cleaning. If desired, a chemical drier such as a calcium chloride drier may be added to completely remove any remaining moisture.

The gases, now under pressure, pass to the heat treatment chamber 11, a standard furnace vent pipe 29 having a removable cover or plug 29a, being provided for use when some of the gases are to be vented instead of recirculated. The gases preferably pass through a separate heating chamber 30 heated in any suitable manner and equipped with a refractory or metal muffle, to serve as a preheater for the gaseous products. The gases then pass to the heat treatment chamber 11, a baffle 31 being positioned in the path of the inflowing gases to deflect the gases upwardly, or laterally if desired, to additionally heat the gases to the chamber temperature before contacting with the work on the hearth. The heat treatment chamber has a bottom, sides, rear and top, but no front, and communicates with a slot or passageway such as illustrated in U. S. Patent No. 1,724,583, which leads back to the combustion chamber, whereby a continual recirculation is obtained. With a furnace 10" x 12" x 24", a normal inlet of gas and air to the combustion chamber would be 250 cubic ft. per hour; the pump capacity is then preferably adjusted to pass 350 cubic ft. of gaseous products of combustion through the conditioning and modifying equipment. If the water vapor formed in the combustion is say 50 cubic ft. per hour and is all removed or substantially all removed in the system, there will be provided a flow of 100 cubic ft. per hour back to the combustion chamber and an outlet of 200 cubic ft. per hour through the usual vents; a compensator for maintaining the desired flow conditions whether the door be opened or shut, such as disclosed in U. S. Patent No. 1,851,831, may be used.

Figure 3:
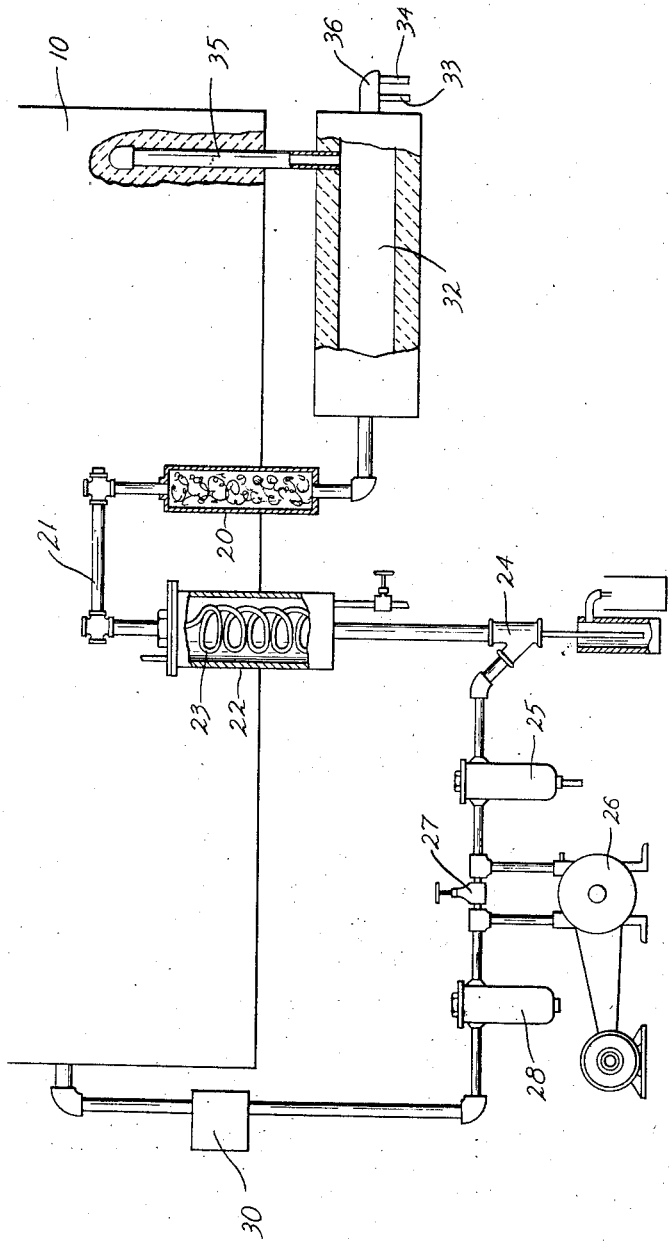
Fig. 3 is a schematic modified arrangement thereof.

When the heat treatment furnace has no combustion chamber, or a built-in combustion chamber is not desired, an insulated separate combustion chamber 32, see Fig. 3, may be used, having regulated gas and air inlet conduits 33, 34, a conduit 35 communicating the interior of the heat treatment chamber therewith, preferably through a curtain slot such as described and illustrated in U. S. Patent No. 1,724,583. In either construction, the combustion takes place in a closed chamber, with exclusion of atmosphere. The additional heat to promote combustion of rich mixtures is then preferably obtained by drawing sufficient hot gases from the heat treatment chamber by excess of the pump volume over the volume admitted to the burner 36. The recirculation and the gas conditioning and modifying equipment are the same as illustrated in Fig. 1 and described in connection therewith.

The novel improvement thus utilizes oxygen supplying and combustible materials, preferably air and gas, which are supplied to a burner in regulated volumes and amounts, for combustion within a combustion chamber closed to the entrance of atmospheric air, the combustion continuing until the chemical reactions thereof are completed, to obtain gaseous products having a definite predetermined constituency, such as for example, a very high CO percentage. The preferred composition has a high CO content, and preferably with the range from 10 to 30° CO, when used for treating alloy steels and particularly high speed steels of the molybdenum and cobalt types.

The resulting gaseous products of combustion are then treated to stabilize the gases and to remove water vapor, and are then conducted to the heat treatment chamber and further stabilized by subjection to heating prior to contacting the work and by catalytic action, resulting from the use of a selected baffle and muffle, and are continually circulated through the heat treating chamber. The work enveloping gases thus form a continually circulating gaseous medium of predetermined constituency, with a continuous supply of stabilized make-up gases to replenish losses by venting.

While I have described a specific method for producing the desired, stabilized enveloping atmosphere and for circulating this atmosphere around the work being heat treated, it is obvious that changes in the volumes and proportions of the gaseous products of combustion and the supply materials therefor, and in the materials used for conditioning, modifying and stabilizing the products of the combustion in the combustion chamber, may be made to suit the requirements for different material treatments, without departing from the spirit and the scope of the invention as defined in the appended claims.

I claim:

1. The method of subjecting high speed steels and the like undergoing heat treatment in a heat treatment chamber to an enveloping atmosphere circulating in a flow cycle, comprising the steps of combusting combustible and oxygen supplying materials in a closed combustion chamber, obtaining gaseous products of combustion of predetermined specific constituency from said combustion, conditioning said products to remove water vapor, subjecting said conditioned products to external heat to bring them to about the temperature of the treatment chamber, conveying the heated conditioned products to the heat treatment chamber to provide an enveloping atmosphere for said steel and conveying at least part of the heated atmospheric products from the treatment chamber to the closed combustion chamber to commingle with the newly formed products of combustion therein so as to produce an unstabilized gaseous product which becomes stabilized when conditioned and raised to the temperature of the heat treatment chamber.

2. The method of subjecting high speed steels and the like undergoing heat treatment in a heat treatment chamber to an enveloping non-carburizing atmosphere of high CO content circulating in a flow cycle, comprising the steps of combusting combustible and oxygen supplying materials in a closed combustion chamber, obtaining gaseous products of combustion of predetermined specific constituency from said combustion, conditioning said products to remove water vapor, subjecting said conditioned products to external heat, conveying the heated conditioned products to the heat treatment chamber to provide an enveloping atmosphere for said steel and conveying at least part of the atmospheric products to the closed combustion chamber to commingle with the newly formed products of combustion therein.

3. The method of subjecting high speed steels and the like undergoing heat treatment in a heat treatment chamber to an enveloping atmosphere of high CO content circulating in a flow cycle, comprising the steps of combusting regulated combustible and oxygen supplying gases in a closed combustion chamber, obtaining gaseous products of combustion of predetermined specific constituency from said combustion, conditioning said products to remove water vapor, subjecting said conditioned products to external heat to raise the temperature thereof to substantially the heat treatment temperature, conveying the heated conditioned products to the heat treatment chamber to provide an enveloping atmosphere for said steel and conveying at least part of the atmospheric products to the closed combustion chamber to commingle with the newly formed products of combustion therein.

4. The method of subjecting high speed steels and the like undergoing heat treatment in a heat treatment chamber to an enveloping atmosphere circulating in a flow cycle, comprising the steps of combusting combustible and oxygen supplying gases in a closed combustion chamber, obtaining gaseous products of combustion of predetermined specific constituency from said combustion, conditioning said products to remove water vapor, subjecting said conditioned products to external heat to bring them to about the temperature of the treatment chamber, conveying the heated conditioned products to the heat treatment chamber to provide an enveloping atmosphere for said steel and conveying at least part of the heated atmospheric products from the treatment chamber to the closed combustion chamber to commingle with the newly formed gaseous products of combustion therein so as to produce an unstabilized gaseous product which becomes stabilized when conditioned and raised to the temperature of the heat treatment chamber.

5. The method of forming an enveloping atmosphere of high CO content for the heat treatment of high speed steels and the like, comprising the steps of supplying combustible and oxygen supplying materials to a closed combustion chamber, the proportion of said materials being selected to liberate insufficient heat of combustion to maintain combustion at room temperatures, and conveying at least part of the enveloping atmosphere of high CO content after the treatment to the combustion chamber during the combustion of the combustible and oxygen supplying materials therein.

CARL I. HAYES.